(No Model.)
C. H. & J. P. EMERY.
GRAIN CAR DOOR.
No. 422,898. Patented Mar. 4, 1890.
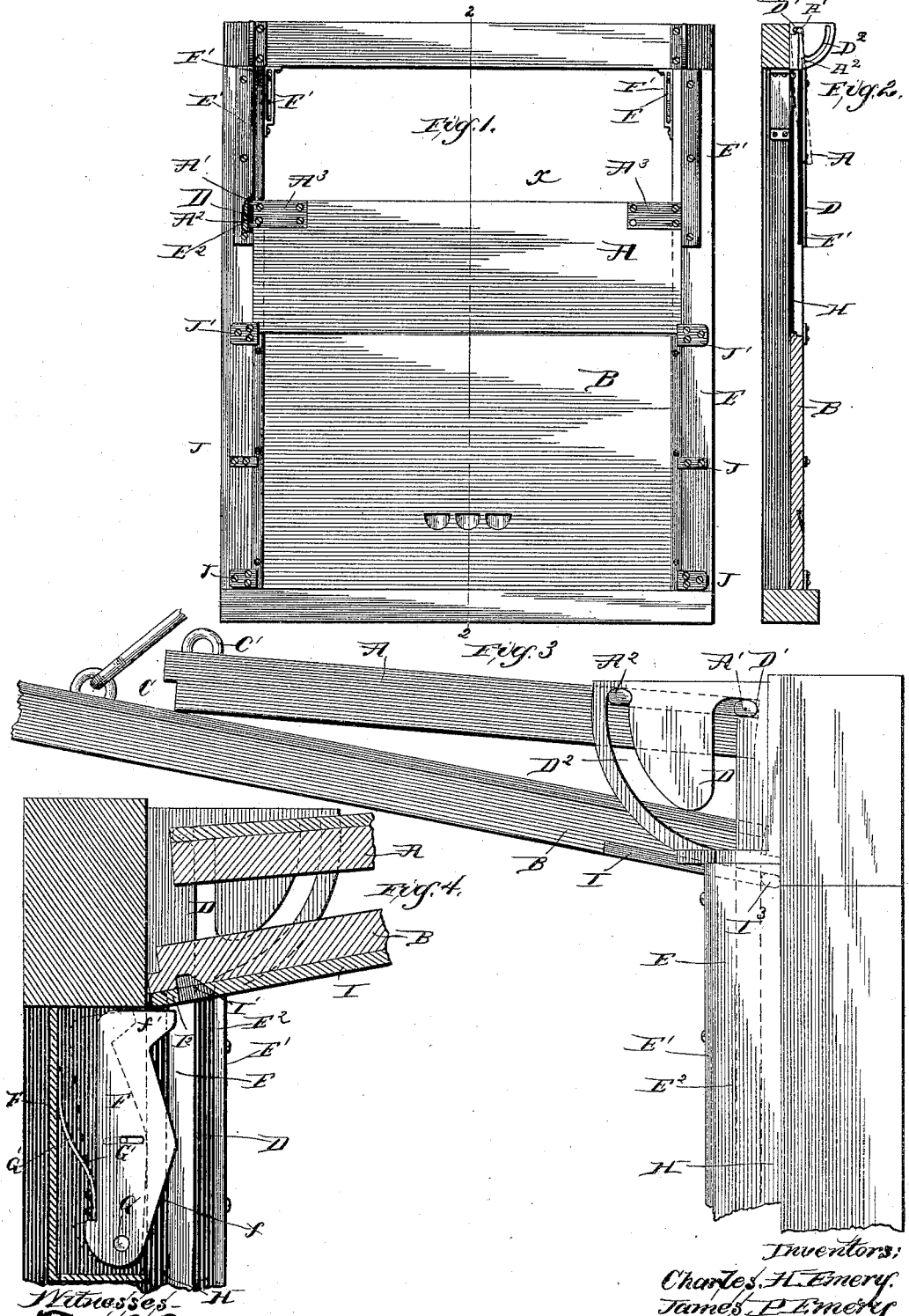
Witnesses
Flora L. Brown
W. H. Scott
Inventors:
Charles H. Emery,
James P. Emery,
By Charles T. Brown
Atty

UNITED STATES PATENT OFFICE.

CHARLES H. EMERY AND JAMES P. EMERY, OF CHICAGO, ILLINOIS, ASSIGNORS OF ONE-THIRD TO DWIGHT B. CARMICHAEL, OF SAME PLACE.

GRAIN-CAR DOOR.

SPECIFICATION forming part of Letters Patent No. 422,898, dated March 4, 1890.

Application filed July 8, 1889. Serial No. 316,771. (No model.)

*To all whom it may concern:*

Be it known that we, CHARLES H. EMERY and JAMES P. EMERY, citizens of the United States, residing at Chicago, in the county of Cook and State of Illinois, have invented certain new and useful Improvements in Grain-Car Doors, of which the following is a specification.

Our invention relates to vertically-sliding doors to be attached to railroad box-cars adapted for the transportation of grain, the purpose of such grain-car door being to retain the grain within the car when such car is loaded therewith, and such grain-car door being designed to be swung upward underneath and against the roof of the car when the car is empty or when other material than grain is loaded therein and such doors are not required for use.

To those skilled in the art it is well known that cars designed for the carrying of grain therein are now being made capable of carrying much greater tonnage than cars heretofore made for such purpose. Such cars are of no greater width than the grain-car heretofore made, and it has been found in practice that when such grain-cars are loaded to their increased capacity the top of the grain in the car is so high above the floor of the car that any vertically-sliding door of sufficient height to contain the same within the car must necessarily be wider than one-half the width of the car, and hence, if such sliding grain-doors be placed opposite each other in the car, when turned up underneath the roof of such car, said doors will interfere with each other. It is therefore very desirable to so construct the doors as to provide for the increased depth of grain which may be carried within the car, and at the same time to provide means for avoiding such interference of oppositely-placed vertically-sliding doors when swung against the roof of the grain-car, and this is one of the principal objects of our invention. To accomplish this purpose we have constructed the grain-car door herein illustrated, described, and claimed in two distinct sections or doors, the lower edge of the upper one thereof resting on the upper edge of the other thereof when said doors are in position to retain grain within the car.

The manner in which the sections of our grain-car door are constructed embodies our invention, and as each of said sections may, when made of the proper depth, constitute the only door required to retain the grain in the car when loaded to the depth that has heretofore been customary, we will hereinafter term such sections the "upper" grain-door and the "lower" grain-door.

We have illustrated our invention by the drawings accompanying this specification and forming a part hereof, in which—

Figure 1 is an elevation of the grain-car door viewed from the inside of the car, looking outward through the opening thereof. Fig. 2 is a cross-section of the door on line 2 2 of Fig. 1. Fig. 3 is an end elevation of the door raised against the roof of the grain-car. Fig. 4 is a sectional view showing one form of constructing a catch, the upper surface of which constitutes the pivotal support or fulcrum around which the lower door is rotated when turned upward against the roof of the grain-car after having been slid vertically into proper place for such turning.

Like letters refer to like parts throughout the several views.

The upper door (lettered A) may constitute the only door closing the opening X when such door is placed on cars carrying light tonnage; but in such case the door A will approximate in width or depth the lower door, which is lettered B in the drawings. When, however, such upper door A is used in connection with the lower door B in the manner illustrated in the drawings, we prefer to construct such upper door of much less depth or width than is the lower door B. This upper door A may slide higher vertically than the lower door B, and when this upper door A is turned upward against the car-roof the inner end thereof is supported by pivots A', while the outer end thereof may rest upon the lower door, as at C in Fig. 3, or may be secured to the roof of the car by a hook or other suitable device interlocking with eye C' or by any of the ordinary means heretofore employed.

A' A² are pivotal extensions of the plate A³, which is secured to the top corners of the upper door A on the inner face thereof in any suitable way. These pivotal extensions form guides, which travel in groove D as the door is slid vertically. At the upper end of groove D there is a recess D′, which forms a step, over which pivot A′ rotates as the door A is turned upward against the roof of the car and upon which it is supported while in such raised position.

D² is a groove running from groove D near the upper end thereof. This groove D² is oval in shape or is struck out, having its center at the center of pivotal support A′ when the door is in the position illustrated in Fig. 3. Practically we make the upper part of groove D and of the groove D² slots in a metal plate adapted to be rigidly secured to the car-door posts E.

F is a lever pivoted at G, and having a spring G′ tending to press it forward in the position illustrated in Fig. 4. It is evident that a coiled spring may be placed back of this lever F to yieldingly hold it in the position illustrated in Fig. 4 in place of the spring G′, if preferred.

ƒ is the inclined edge of lever F, against which edge the outer face of the doors A and B are brought in contact as each is slid upward to its extreme vertical position.

In order that the manner of working of the upper door A may be readily understood and kept distinct from the working of the lower door B, we will here describe the movement of such upper door A while being raised from its position as illustrated in Fig. 1 into the position illustrated in Figs. 3 and 4 before proceeding to describe the construction and movement of the door B. The door A is raised vertically, pivots A′ and A² sliding in groove D. This groove, as is illustrated in Fig. 1, to the left thereof where the covering of such groove is broken away, exposing to view the pivots A′ and A², extends but a short distance below the pivot A², and at the lower part thereof is formed by securing the plate E′ upon the post E and over the rabbeting E² in such door-post E. When the door is raised to its extreme vertical position, the pivot A′ is in front of step D′ in groove D, pivot A² is opposite the opening to groove D² at the lower end thereof, and stop F is pressing against door A, thereby tending to turn the door around upon pivot A′, thus forcing pivot A² into groove D². As soon as the door is turned outward from the post, say into the position indicated by the dotted lines in Fig. 2, it is prevented from descending by its pivot A² in groove D², the entire weight of the door resting, if desired, upon pivot A² in said groove D². As the door is turned upward against the roof of the car pivot A² in groove D² gradually forces pivot A′ backward over and upon step D′, and when the upper door A is in the position illustrated in Fig. 3 the weight of the inner edge thereof is supported by such pivot A′ so resting on step D′, such weight having been gradually transferred thereto from pivot A², upon which the entire weight of the door might have rested when in the position illustrated by the dotted lines in Fig. 2.

The lower door B is constructed and operates as follows: H is a groove in the door-post E, extending a short distance below the upper edge of the door B when such door is in the position illustrated in Fig. 1. I is a plate rigidly secured to the upper outer surface of door B at each corner thereof. I′ is a hole in plate I. I³ is a pivotal extension of plate I, which slides freely in groove H as the door rises or falls vertically. J J J′ are plates or clips secured to door-post E, holding door B in the rabbet in door-post E.

In the operation of this door B the extreme upward vertical movement is less than is that of door A. As the door B slides upward plate I thereon comes in contact with the inclined edge ƒ of the pivoted lever F, and the lever is thus forced backward into the casing therefor F′. So long as the door B is in contact with door-post E along the entire face of said door B the lever F is held in its retracted position; but as soon as any movement of said door B tending to turn it upward underneath the roof of the car is made, and before the lower edge of this door B has passed over and outside of the front face of clip J′, this lever F will be advanced by spring G′ into such position that the point ƒ′ of the lever F will enter into holes I′ in plate I. In the further rotation of the door this point ƒ′ of the lever F constitutes the fulcrum on which the door turns, and part I² of the plate I forms the pivot turning on fulcrum ƒ′. The pivotal extension I³, sliding vertically in groove H, holds the upper edge of door B in position against the posts E, and as the door is turned upward underneath the roof of the car it is, and while supported upon the upper edge of the lever F, as described, prevented from falling forward by such pivot I³ in groove H. The clip J′ is placed the proper height on post E so that as the door B is swung outward from the post it passes over such clip J′, and such clip will hold the door upward off of lever F as said lever is pressed forward by spring G′ until the point ƒ′ of said lever F has entered a sufficient distance into hole I′ in plate I to support the door so firmly as to avoid all fear of its falling in the turning of it upward against the car-roof.

Having thus described our invention, what we claim, and desire to secure by Letters Patent, is—

1. In a grain-car door, the combination of the grain-car door, pivotal extensions thereon projecting beyond the edge thereof near the upper part of the door, a vertical groove in the door-post, within which such pivotal extensions are adapted to slide, a step in the upper end of the vertical groove, upon which the upper of the pivotal extensions may turn, and a curved groove running from the first-named vertical groove and adapted to receive the lower of the pivotal extensions on the door and guide the same, thereby forcing the upper of such pivotal extensions over the step therefor, all substantially as described.

2. In a grain-car door, the combination of the grain-car door, a plate having an opening therein secured rigidly upon the upper outer face of such door, a pivotal extension extending outward from the side of the door near the upper edge thereof into a groove within which such pivotal extension is adapted to slide vertically, and a lever yieldingly held in a forward position, wherein the upper end of such pivoted lever is adapted to form a fulcrum upon which the door may be rotated, and an inclined edge or face on such pivoted lever, whereby such lever is retracted from the opening in the plate thereon when the door is in a perpendicular position against the door-posts of the car, all substantially as described.

3. In a grain-car door composed of sections, the combination of a section having thereon near the upper edge thereof pivotal extensions extending into a groove in the posts of the car-door opening, a curved groove extending from the first-named groove and adapted to receive and guide the lower of such pivotal extensions and to force the upper of such pivotal extensions over and upon a step at the upper end of the first-named groove, with a second section having a plate with an opening therein secured on the upper outer face thereof, a pivotal extension extending into a second groove in the posts of the car-door opening, and a pivoted lever adapted to enter into the opening in the plate in the second section as such section is turned away from the car-door posts, and form a fulcrum on which it is rotated, all substantially as described.

CHARLES H. EMERY. [L. S.]
JAMES P. EMERY. [L. S.]

Witnesses:
DWIGHT B. CARMICHAEL,
FLORA L. BROWN.